(12) United States Patent
Paddon et al.

(10) Patent No.: US 7,266,370 B2
(45) Date of Patent: Sep. 4, 2007

(54) SYSTEM AND METHOD FOR DEVELOPING AND DEPLOYING DEVICE INDEPENDENT APPLICATIONS

(75) Inventors: Tom Paddon, Brisbane, CA (US); Meyyappan Alagappan, Santa Clara, CA (US)

(73) Assignee: Trilibis Inc., San Francisco, CA (US)

( * ) Notice: Subject to any disclaimer, the term of this patent is extended or adjusted under 35 U.S.C. 154(b) by 149 days.

(21) Appl. No.: 10/963,929

(22) Filed: Oct. 12, 2004

(65) Prior Publication Data

US 2006/0063518 A1 Mar. 23, 2006

Related U.S. Application Data

(60) Provisional application No. 60/611,353, filed on Sep. 20, 2004.

(51) Int. Cl.
*H04Q 7/20* (2006.01)
(52) U.S. Cl. ..................... 455/418; 455/419
(58) Field of Classification Search ............... 455/418, 455/419, 429, 412.1, 412.2, 414.1
See application file for complete search history.

(56) References Cited

U.S. PATENT DOCUMENTS

| | | | |
|---|---|---|---|
| 6,763,226 B1 * | 7/2004 | McZeal, Jr. ............... | 455/90.2 |
| 6,901,255 B2 * | 5/2005 | Shostak .................... | 455/422.1 |
| 6,996,394 B2 * | 2/2006 | Minear et al. ........... | 455/412.1 |
| 7,076,239 B2 * | 7/2006 | Kirkup et al. ............. | 455/411 |
| 2003/0232618 A1 * | 12/2003 | Le et al. ................... | 455/412.2 |
| 2004/0203855 A1 * | 10/2004 | Veerasamy et al. ...... | 455/456.1 |
| 2005/0009510 A1 * | 1/2005 | Tsuda et al. ............... | 455/418 |

* cited by examiner

Primary Examiner—CongVan Tran
(74) Attorney, Agent, or Firm—Morrison & Foerster LLP

(57) ABSTRACT

Embodiments of the invention provide the ability to develop and deploy device independent applications for mobile communication devices having disparate operating systems. A workflow module is used to create an application comprising rule sets that are independent of mobile communication device specific operating system. The look and feel of each application is independent of the mobile communication device in which each application ultimately executes. Each mobile communication device executes a UI Engine that is specific to the device and operating system running on the device. Since the UI Engine is developed once per device and is capable of executing applications interfaces, the only element to be downloaded into each mobile communication device is a UI component comprising a rule set and content data that makes up an application screen. Upon receiving a user input the UI Engine sends an event comprising the application name, screen name, user operation and any user data to a server having a rule interface component. The rule interface component processes the event and based on the rule set builds the next UI component from the rule set and content data and sends the next UI component to the UI Engine. The UI components may be dynamically loaded each time they are accessed, cached for each session or stored permanently on the mobile communication device in order to optimize the responsiveness of the application. If an error is found in an application the error may be fixed in one location at the server and deployed into each mobile communication device the next time the application is accessed. In this way applications are always up to date and repaired on multiple communication devices hosting disparate operating systems with one upload to the server. UI components may be transmitted to mobile communication devices in binary format to further optimize the responsiveness of the application.

22 Claims, 5 Drawing Sheets

```xml
<?xml version="1.0" encoding="utf-8"?>
<WorkFlowData BackColor="32896" Version="2" Name="demo" FlagColor="8388736">
  <WorkFlowDashBoardDataList>

<WorkFlowDashBoardData LocX="124" ID="2" LocY="222"
      Name="LOGIN" Version="632297280888915648"
      CachingType="1" IsBackButtonEnbaled="True"
      BorderSize="0" FillBorder="True"
      TimeOut="3" ImageData="" ImageId="" ForeGroundColor="0"
      BackGroundColor="16777215" BorderColor="16777215">
      <MenuComponent ListType="" Name="MENU" ComponentType="10" ...>
        <WorkFlowValueList>
          <WorkFlowStringData Value="OK" />
        </WorkFlowValueList>
      </MenuComponent>
      ...
      <WorkFlowExitDataList>
        <WorkFlowExitData SelectedItem="MENU.OK" DashBoard="WELCOME"
          DashBoardID="1" ArgName="" ArgValue="" Type="False">
          <WorkFlowImageData ImageDataId="" BinaryData="" />
        </WorkFlowExitData>
      </WorkFlowExitDataList>
    </WorkFlowDashBoardData>

<WorkFlowDashBoardData LocX="324" ID="1" LocY="65" Name="WELCOME"
      ...
    </WorkFlowDashBoardData>

<WorkFlowDashBoardData LocX="50" ID="0" LocY="50"
      Name="SPLASH" Version="632297280708756592"
      CachingType="1" IsBackButtonEnbaled="False" ...>
      ...
      <WorkFlowExitDataList>
        <WorkFlowExitData SelectedItem="TIMEOUT" DashBoard="LOGIN"
          DashBoardID="2" ArgName="CLOGIN" ArgValue="False" Type="False">
          <WorkFlowImageData ImageDataId="" BinaryData="" />
        </WorkFlowExitData>
        <WorkFlowExitData SelectedItem="TIMEOUT" DashBoard="WELCOME"
          DashBoardID="1" ArgName="CLOGIN" ArgValue="True" Type="False">
          <WorkFlowImageData ImageDataId="" BinaryData="" />
        </WorkFlowExitData>
      </WorkFlowExitDataList>
    </WorkFlowDashBoardData>

</WorkFlowDashBoardDataList>
  <FlagsDataList>
    <WorkFlowCookieData Name="LOGIN" Type="0" />
  </FlagsDataList>
</WorkFlowData>
```

Figure 3

SYSTEM AND METHOD FOR DEVELOPING AND DEPLOYING DEVICE INDEPENDENT APPLICATIONS

This application takes priority from U.S. patent application Ser. No. 60/611,353, filed on Sep. 20, 2004 to Paddon entitled "SYSTEM AND METHOD FOR DEVELOPING AND DEPLOYING DEVICE INDEPENDENT APPLICATIONS" which is hereby incorporated herein by reference. U.S. application Ser. No. 10/605,532 to Paddon, entitled "System and Method for the Aggregation and Matching of Personal Information" filed Oct. 6, 2003, is hereby incorporated herein by reference.

BACKGROUND OF THE INVENTION

1. Field of the Invention

Embodiments of the invention described herein pertain to the field of computer software and/or hardware related to mobile communication devices. More particularly, but not by way of limitation, the computer software and/or hardware enables the development and deployment of applications that are independent of the mobile communication device upon which the application is executed.

2. Description of the Related Art

The term mobile communication device refers to any apparatus configured to send and receive data. Some examples of mobile communication devices include cell phones, PDAs, portable computers, or any device able to send and receive data over a communication network. Over the past several years mobile communication devices have become an integrated part of everyday life. This has led to a proliferation of applications intended for use in a mobile environment. As such mobile devices are often required to serve as a platform for executing various types of applications.

The problem that arises in creating applications that must execute across various different device types is that these different devices often have different operating systems and development environments. PDAs, for instance, may use Windows CE (TM), the Palm OS (TM) as the underlying operating system upon which software executes. Cell phones providers have attempted to overcome this problem by developing technologies such as BREW, J2ME, and WAP that act as platforms which enable software to execute across multiple types of mobile devices. JAVA and other virtual machine (VM) technologies also provide systems with the ability to execute software that is native to the VM rather than the operating system upon which the VM executes.

Although attempts have been made to create device independent operating systems (such as the ones described above), the incompatibility problem largely remains in that each cell phone provider has their own unique "solution" to address the issue. Hence, applications must still be written for a specific platform. Software written for one company, for instance, must be written to execute on BREW whereas software written for another company must be able to execute on J2ME for example.

Deploying one application to multiple platforms requires that developers write multiple applications where each application is specific to a particular platform. This remains to be the case even though the functionality of the application and often the interface itself is intended to be the same regardless of the underlying operating system. This process requires developers of mobile communication applications to invest significant time and resources in developing applications that are platform specific and in some case (e.g., where screen sizes dramatically differ) device specific. When a program error is discovered in an application specific to a particular platform, the error must be fixed in multiple platform dependent copies of the application and then deployed separately to multiple server systems. Each time an application is ported to a separate application environment a team of developers is required to invest their time and energy into developing, maintaining, and upgrading the program. It is not uncommon for companies to employ completely separate teams of developers to develop different versions of the same application. This is a significant waste of resources, but one that is required by current design limitations.

Because of these and other limitations inherent in the design of current systems there is a need for a system that enables developers to efficiently develop, deploy and maintain one instance of an application that can execute on multiple disparate mobile communication platforms.

BRIEF SUMMARY OF THE INVENTION

Embodiments of the invention provide developers with the ability to develop and deploy device independent applications for mobile communication devices having disparate operating systems. A workflow module is used to create an application comprising rule sets. These rule sets while defining application behavior are independent of a specific mobile communication device operating system. The look and feel of each application is independent of the mobile communication device in which each application ultimately executes. Each mobile communication device executes a UI Engine that is specific to the device and operating system running on the device. Since the UI Engine is developed once per device and is capable of executing application interfaces, the mobile communication device can perform the necessary functions by downloading a UI component comprising a rule set and content data. Collectively this information makes up a set of application screens. Upon receiving a user input the UI Engine sends an event comprising the application name, screen name, user operation and any user data to a server having a rule interface component. Other methods resulting in the loading of UI Components by or to the UI Engine comprise a GPS coordinate change, an incoming SMS or phone call, a WAN signal, Bluetooth message from any local electronics device or any other asynchronous event detectable by a mobile communications device.

The rule interface component processes the event and based on the rule set builds the next UI component from the rule set and content data. To build another UI component the process iterates by sending the next UI component to the UI Engine. The UI components may be dynamically loaded each time they are accessed, cached for each session or stored permanently on the mobile communication device in order to optimize the responsiveness of the application. Permanent storage may include flash memory, read-only memory, or any other memory capable of retaining information after power-off. If an application modification is performed, for example after a client/customer request or if an error is found in an application then the application modification occurs in one location at the server and is deployed into each mobile communication device the next time the application is accessed. In this way applications are always up to date and repaired on multiple communication devices hosting disparate operating systems with one upload to the server. UI components may be transmitted to mobile communication devices in binary format to further optimize the responsiveness of the application.

Creation of a rule set with a graphical development embodiment of the workflow module comprises dropping icons representing screens onto a palette and connecting screens with a line drawing tool. The lines connecting the icons represent events that allow for alternate screens to be shown from the UI Engine. Although an embodiment of the workflow module comprises icons and events represented graphically, there is no requirement to show these elements in this manner and since a rule set can be an XML file or any other set of data able to define rules, the rule set may be created in a text editor. The rule set (e.g., XML, etc . . . ) contains screen names, background colors, button names, dimensions and labels and any image data or content data that is needed for an application including the events which allow for traversing screens in the application.

When a user downloads an application into a mobile communication device, an embodiment of the invention allows for a UI Engine for the specific type of mobile communication device to be transparently downloaded before the first UI component of the application (for example a splash screen) is downloaded. In other embodiments, the UI Engine is downloaded at the factory, by beaming from a cell phone or by infrared transfer to the mobile communication device. Any other method of downloading an application to a mobile communications device is in keeping with the spirit of the invention. Download of the UI Engine may also be part of the download of an application and a user may not be aware that a UI Engine has been downloaded. Regardless of the method in which the UI Engine for the device specific operating system is loaded, once the UI Engine is executing on a mobile communication device there are two tasks the UI Engine generally performs.

The first task of the UI Engine is to display a UI component as requested by the application. This may involve a request to a server system for combining a rule set for a given mobile communication device, application and screen with content obtained from a third party content provider via an adapter. Alternatively, displaying a UI component may involve processing a message from another mobile communications device locally and determining the subsequent UI component to display via logic local to the mobile communications device. The adapter allows conversion of the native format of the content on the content provider's system to a format suitable for combination with a rule set in order to form a UI component for transmittal to a mobile communication device. The rule set determines what events and data are sent back and when the events and data are sent to the rule interface component when a particular interface element for example a button is asserted by a user.

The second task is to act as an event handler for user inputs which are interpreted and formed into events comprising an application name, screen name, operation name such as a button name and any user input data and either processed locally or sent to a rule interface component in a server system. Once the local logic or rule interface component has interpreted the event a second UI component for display on the mobile communication device is generated, possibly including content from a content provider. Alternatively, if a screen is not required to change, for example when a user has failed to enter an item required before accessing another screen, then the UI Engine may check the UI component comprising a rule set and locally highlight the field that is required before allowing an event to be sent to the rule interface component.

Due to the fact that most network speeds between a mobile communication device and a server system are low, UI components and events may be encoded in binary in order to increase the responsiveness of the applications. XML tends to be larger than binary formatted files that encode long text based names such as "<SCREEN_ID>TIMESHEET_APP_SCREEN_5</SCREEN_ID>" with 8 bit or 16 bit numbers for example representing a screen identification for example screen ID '0101' (5). In this example the XML entry for screen identification including tags would require 46 bytes to be transmitted while a binary formatted message where one byte is reserved in a particular location in a buffer yields a factor of 46 in reduction of bits sent. This is an enormous advantage when the amount of fields sent is large. As memory is cheap, the XML may be kept as is for debugging purposes or auditing purposes on the server and also encoded into binary blocks for ease of assembly at content insertion time.

When a bug is found in an application the workflow module may be re-run in order to fix the application and re-deploy the rule set into the server system. The UI Engines have the option of dynamically asking for a UI component every time, or caching the UI component for a session or permanently storing a UI component so that the application may only ask for content to fill the needs of a UI component. Each UI component may comprise a version ID which is simply checked at any convenient time in the UI Engine and if the UI component is found to be outdated regardless of the dynamic, cached or permanent status of the UI component on the mobile communication device, then the new version of the UI component may be downloaded to correct the fixed bug. Since this download happens automatically and since the deployed rule set was changed once, the result is that a bug can be fixed once and propagated to as many types of mobile communication devices as use the application seamlessly.

The version identification of the UI Engine may be checked at any time and the UI Engine itself may be reloaded into the mobile communication device. This may occur automatically or optionally by prompting a user. Since an update to a UI Engine affects only one mobile communication device hosting a device specific operating system only those mobile communication devices hosting the specific UI Engine are affected. This is unlike the automatic update of an application across all types of mobile communication devices at once since applications are independent of the mobile communication device.

Alternatively, in order to optimize the precise application appearance, it is possible to also generate rule sets based on a resolution size for a device. This allows fine tuning of button sizes and label sizes for example in order to take full advantage of the layout of the mobile communication device specific display and may default to the standard rule set if no optimization has occurred for a range of display sizes for a given mobile communication device type.

BRIEF DESCRIPTION OF THE DRAWINGS

FIG. 3 shows an example listing of XML produced by the workflow module.

DETAILED DESCRIPTION OF THE INVENTION

Figure 1:
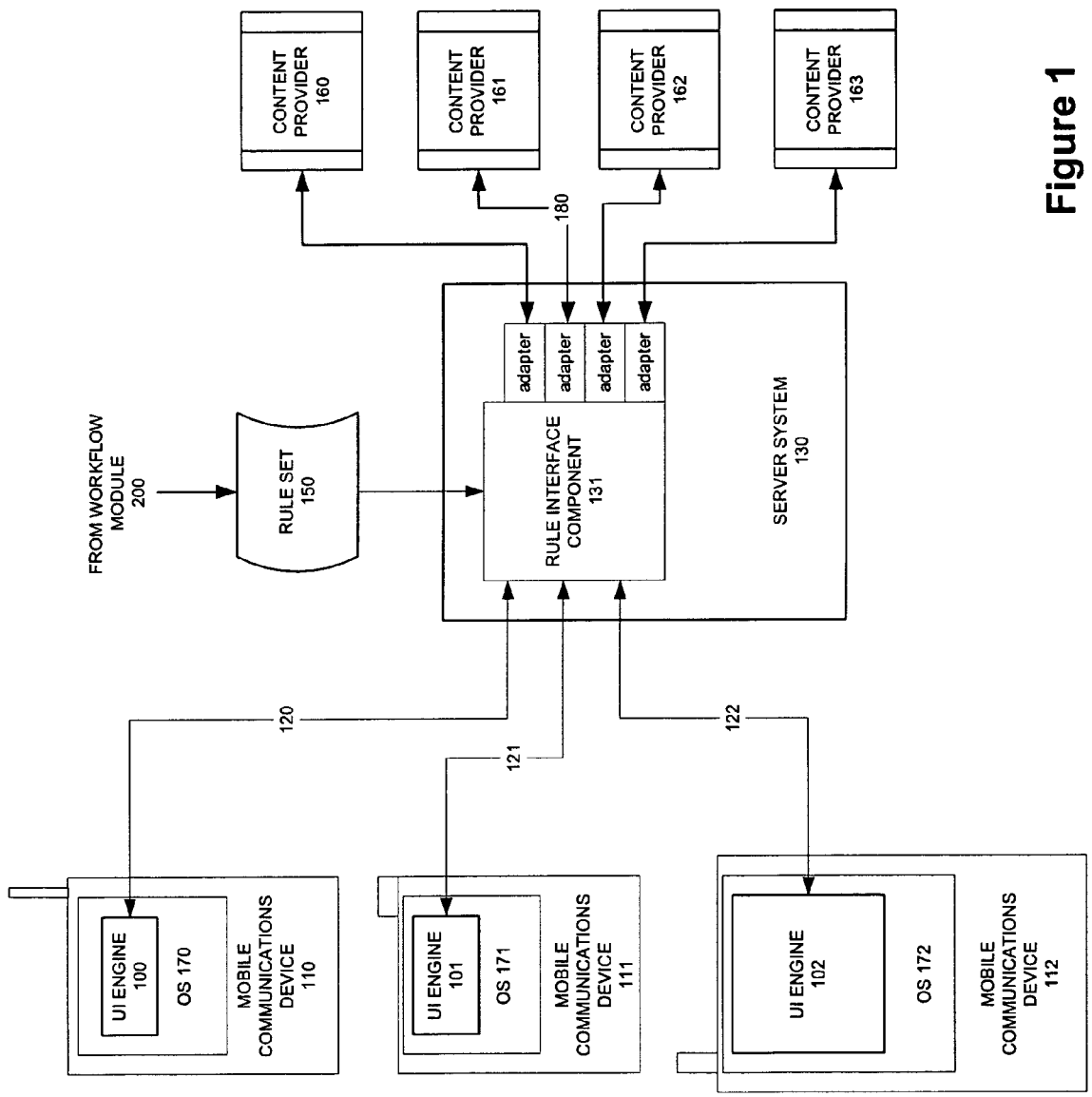
FIG. 1 shows an architectural view of an embodiment of the invention.

Embodiments of the invention provide users with the ability to develop and deploy device independent applications for mobile communication devices having disparate operating systems. In the following description numerous specific details are set forth in order to provide a more thorough understanding of embodiments of the invention. It will be apparent, however, to an artisan of ordinary skill that the present invention may be practiced without incorporating all aspects of the specific details described herein. Any mathematical references made herein are approximations that can in some instances be varied to any degree that enables the invention to accomplish the function for which it is designed. In other instances, specific features, quantities, or measurements well-known to those of ordinary skill in the art have not been described in detail so as not to obscure the invention. Readers should note that although examples of the invention are set forth herein, the claims, and the full scope of any equivalents, are what define the metes and bounds of the invention.

A workflow module is used to create an application comprising rule sets. These rule sets are independent of mobile communication device operating system for which they are developed. The look and feel of each application is independent of the mobile communication device in which each application ultimately executes. Each mobile communication device executes a UI Engine that is specific to the device and operating system running on the device. Device specific information may be available locally through the UI Engine and/or may alternatively be a part of the UI component sent to the UI Engine.

Since the UI Engine is developed once per device and is capable of executing applications interfaces, the only element to be downloaded into each mobile communication device is a UI component comprising a rule set and content data that makes up an application screen. Upon receiving a user input the UI Engine sends an event comprising the application name, screen name, user operation and any user data to a server having a rule interface component. The rule interface component processes the event and based on the rule set builds the next UI component from the rule set and content data and sends the next UI component to the UI Engine. The UI components may be dynamically loaded each time they are accessed, cached for each session or stored permanently on the mobile communication device in order to optimize the responsiveness of the application. If an error is found in an application that error may be fixed in one location at the server and deployed into each mobile communication device the next time the application is accessed. In this way applications are always up to date and repaired on multiple communication devices hosting disparate operating systems with one upload to the server. UI components may be transmitted to mobile communication devices in binary format to further optimize the responsiveness of the application.

FIG. 1 shows an architectural view of an embodiment of the invention. Mobile communication devices 110, 111 and 112 each comprise a device specific operating system 170, 171 and 172 respectively, for example Palm OS, Brew, J2ME or any other operating system capable of running on a mobile communication device. Each mobile communication device comprises a UI Engine configured to execute on a device specific operating system. For example UI Engine 100 executes on device specific operating system 170 which is specific to mobile communication device 110. UI Engines 100, 101 and 102 communicate with rule interface component 131 in server system 130. Rule interface component 131 comprises adapters for communicating with disparate content providers 160, 161, 162 and 163. There is no limit to the number of types of mobile communication devices or content providers coupled with the system. Rule interface component 131 obtains rule sets from workflow module 200 (see FIG. 2). Each rule set 150 combined with content from one or more content providers (for example content provider 160) yields a User Interface (UI) component, which is also known as a dashboard. Each rule set 150 is independent of a device specific operating system such as operating system 170 for example.

When rule set 150 is processed by rule interface component 131, rule set 150 is parsed and saved for event processing. Event processing occurs, for example, when UI Engine 100 asserts an application graphical user interface element such as a button. When mobile communication device 111 is commanded by a user to execute an application, an initial UI component is constructed from application rule set 150 and content data from content provider 162. The initial UI component is sent across communications link 121 and interpreted by UI Engine 101 which results in a UI component such as a splash screen or login screen for example to be presented on mobile communication device 111.

When a button is pressed, for example drawn on the mobile communication device as instructed by the UI component, the application name, screen name, operation asserted by the user (such as a button press for a given button name) and any user input data is transmitted from UI Engine 101 to rule interface component 131 for processing. Based on the application name, screen name, operation asserted by the user and any user input, rule interface component 131 combines a new rule set for a screen as parsed from application rule set 150 with content from any required content providers and generates a second UI component that is interpreted by the UI Engine of the particular device where the event occurred.

Figure 2:
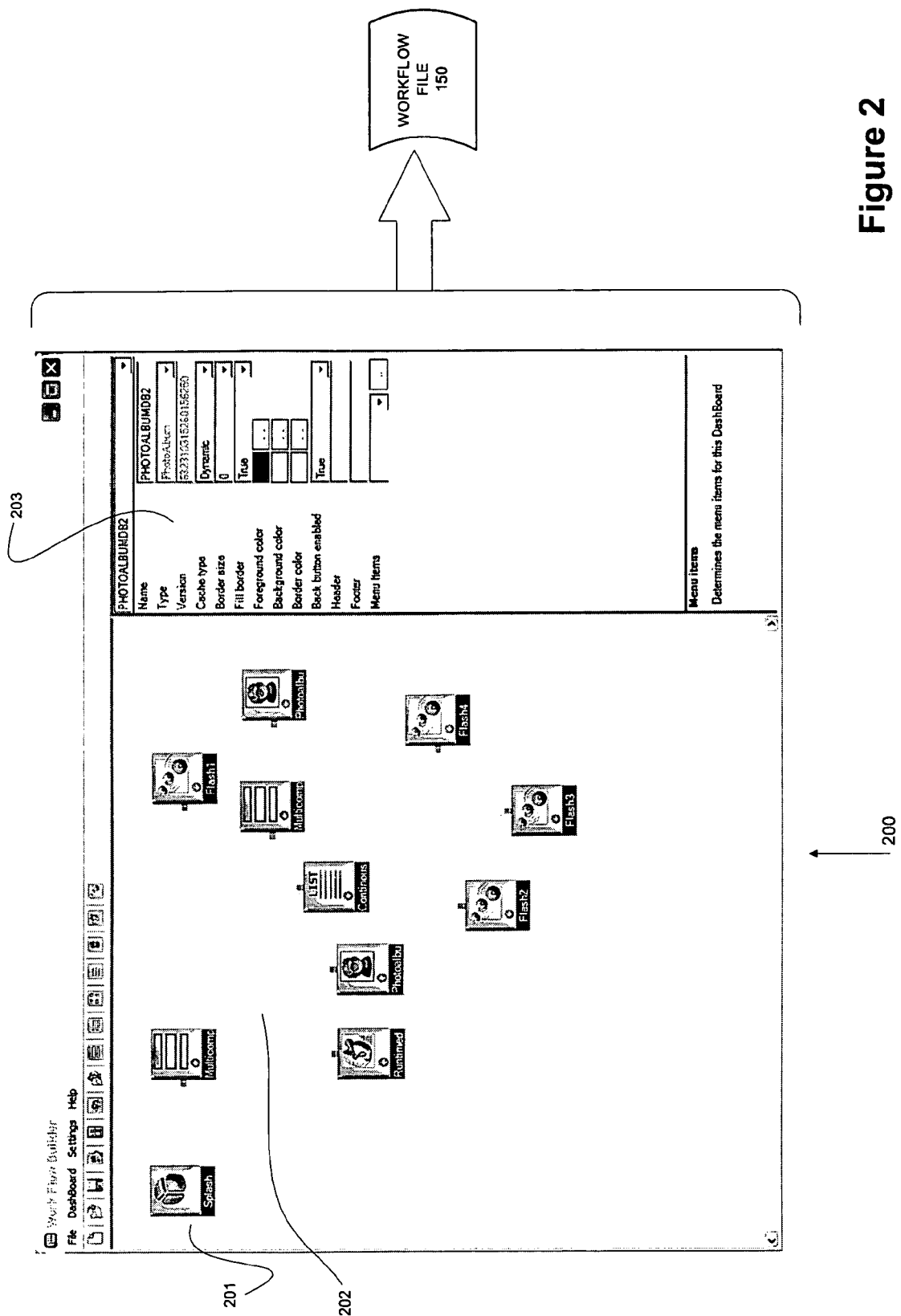
FIG. 2 shows a screen shot of an embodiment of the workflow module.

FIG. 2 shows a screen shot of an embodiment of the workflow module. Creation of a rule set with a graphical development embodiment of the workflow module comprises dropping icons (such as splash screen icon 201) representing screens onto a palette and connecting screens with a line drawing tool. The lines connecting the icons represent events, for example event 202 that allows for an alternate screen to be shown via the UI Engine when a button is pressed. Although an embodiment of the workflow module comprises icons and events represented graphically, there is no requirement to show these elements in this manner and since a rule set is can be an XML file or any other type of rule based data set, the rule set may be created in a text editor which forms a text based embodiment of a workflow module. The XML contains the screen names, background colors, button names, dimensions and labels as presented in attribute window 203 along with any image data or content data that is needed for an application including the events which allow for traversing screens in the application.

FIG. 3 shows an example listing of XML produced by the workflow module. Line 1 of the XML describes encoding of the XML. Line 2 of the XML describes the name of the workflow "demo". Line 3 comprises an XML tag that surrounds a list of dashboards or UI components. Line 4 is blank for ease of illustration. Line 5 comprises an XML tag that surrounds a block of XML that defines the "LOGIN" screen as described on line 6 along with the version identification of the "LOGIN" screen. The version identification is used in order to update the "LOGIN" screen on any mobile communication that does not have that latest version. Other attributes are listed that determine the look and feel and the functional settings for the UI component. In addition, a MenuComponent block is described on line 11 that generates a value of "OK" if the menu item is selected as shown on line 13. Line 18 shows that when "MENU.OK" is selected, the next UI component to be displayed is the "WELCOME" UI component. Line 25 is a condensed version of the "WELCOME" UI component the details of which are not listed for ease of illustration. Line 29 comprises an XML tag that surrounds a block of XML that defines the "SPLASH" screen as described on line 30. The "SPLASH" UI component comprises two exit points defined on lines 34 and 38 that direct the flow of UI components to the "LOGIN" or "WELCOME" screen depending upon the value of the "CLOGIN" argument meaning that when the "SPLASH" UI component times out, if the "CLOGIN" value has been set then the next UI component that is shown is the "WELCOME" screen and if the "CLOGIN" value has not been set, then the next UI component shown is the "LOGIN" screen. The "CLOGIN" value may be passed to the UI Engine from the server system as true after the user has logged in. The "CLOGIN" value may be kept in a session on the server and passed as a cookie back to the UI Engine for example.

When a user downloads an application into a mobile communication device, an embodiment of the invention allows for a UI Engine for the specific type of mobile communication device to be transparently downloaded before the first UI component of the application (for example a splash screen) is downloaded. In other embodiments, the UI Engine is downloaded at the factory, by beaming from a cell phone or by infrared transfer to the mobile communication device. Download of the UI Engine may also be part of the download of an application and a user may not be aware that a UI Engine has been downloaded. Regardless of the method in which the UI Engine for the device specific operating system is loaded, once the UI Engine is executing on a mobile communication device there are two tasks the UI Engine generally performs.

The first task of the UI Engine is to display a UI component as requested by the application. This may involve a request to a server system for combining a rule set for a given mobile communication device, application and screen with content obtained from a third party content provider via an adapter. Alternatively, displaying a UI component may involve processing a message from another mobile communications device locally and determining the subsequent UI component to display via logic local to the mobile communications device. The adapter allows conversion of the native format of the content on the content provider's system to a format suitable for combination with a rule set in order to form a UI component for transmittal to a mobile communication device. The rule set determines what events and data are sent back and when the events and data are sent to the rule interface component when a particular interface element for example a button is asserted by a user.

The second task is to act as an event handler for user inputs which are interpreted and formed into events comprising an application name, screen name, operation name such as a button name and any user input data and either processed locally or sent to a rule interface component in a server system. Once the local logic or rule interface component has interpreted the event a second UI component for display on the mobile communication device is generated, possibly including content from a content provider. Alternatively, if a screen is not required to change, for example when a user has failed to enter an item required before accessing another screen, then the UI Engine may check the UI component comprising a rule set and locally highlight the field that is required before allowing an event to be sent to the rule interface component.

Figure 4:
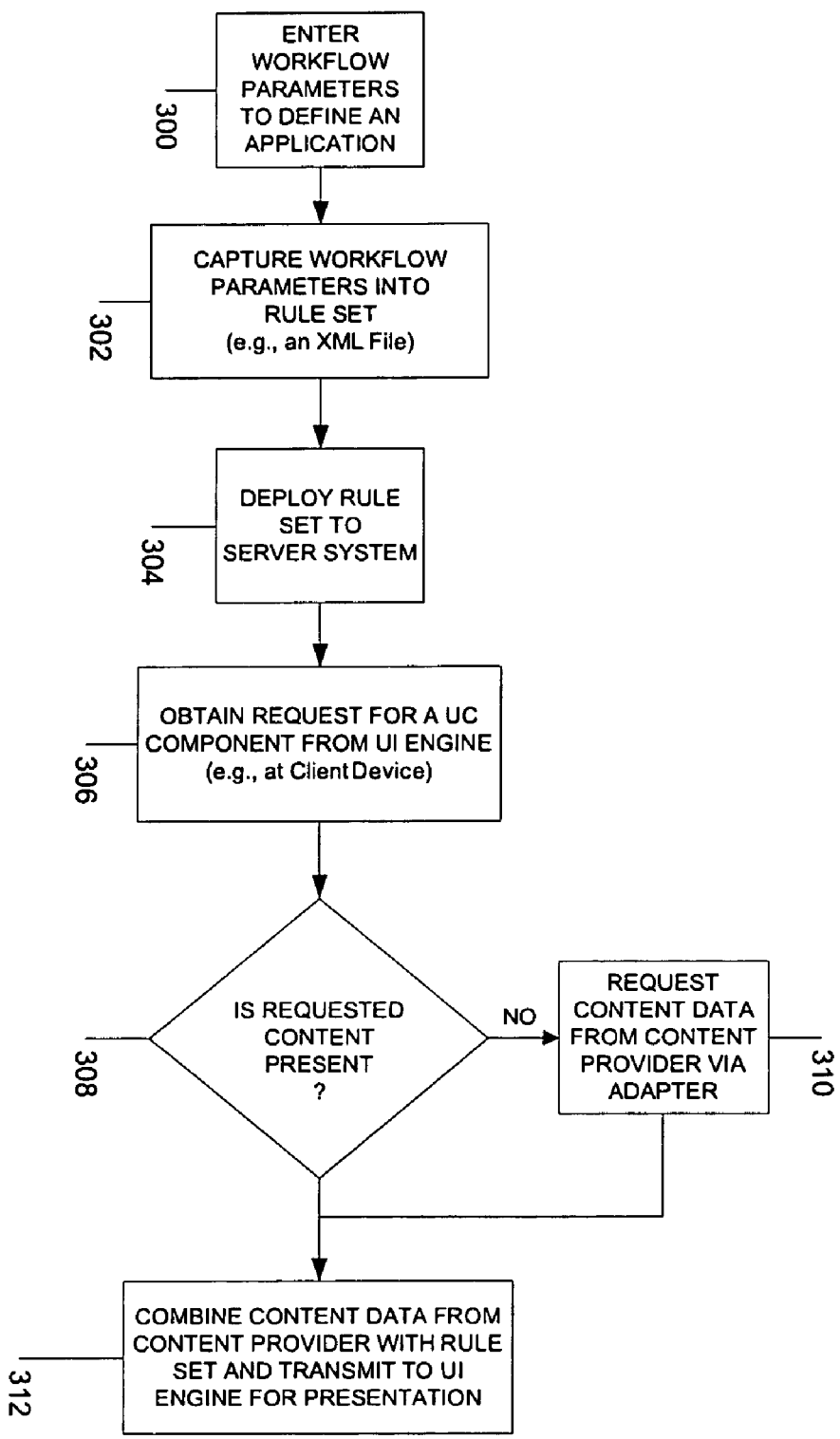
FIG. 4 shows a flow chart of the creation of a UI component based on the rule set and content data.

FIG. 4 shows a flow chart of the creation of a UI component based on the rule set and content data. The workflow parameters are entered at 300 via a workflow module that may be graphically based as in FIG. 2 or via any other method of creating compliant XML of FIG. 3 such as via a text editor embodiment of the workflow module. Once the parameters defining an application are entered, the XML is created at 302. The XML may be optionally tested at this point although with a graphical based workflow module embodiment as long as the events are coupled and the screens are laid out properly then the application is functionally complete. The XML rule set is deployed to a server system at 304. When a user requests an application or sends an event in order to obtain a UI component at 306 then the server system determines if the content required for the UI component such as image data for example is present at 308 and if not requests the content data from a content provider at 310. The rule set and content data are combined and set to the UI Engine at 312 for display on the mobile communication device.

Due to the fact that most transmit speeds between a mobile communication device and a server system are low, UI components and events may be encoded in binary in order to increase the responsiveness of the applications. XML tends to be larger than binary formatted files that encode long text based names such as "<SCREEN_ID>TIMESHEET_APP_SCREEN_5</SCREEN_ID>" with 8 bit or 16 bit numbers for example representing a screen identification for example screen ID '0101' (5). In this example the XML entry for screen identification including tags would require 46 bytes to be transmitted while a binary formatted message where one byte is reserved in a particular location in a buffer yields a factor of 46 in reduction of bits sent. This is an enormous advantage when the amount of fields sent is large. As memory is cheap, the XML may be kept as is for debugging purposes or auditing purposes on the server and also encoded into binary blocks for ease of assembly at content insertion time.

Figure 5:
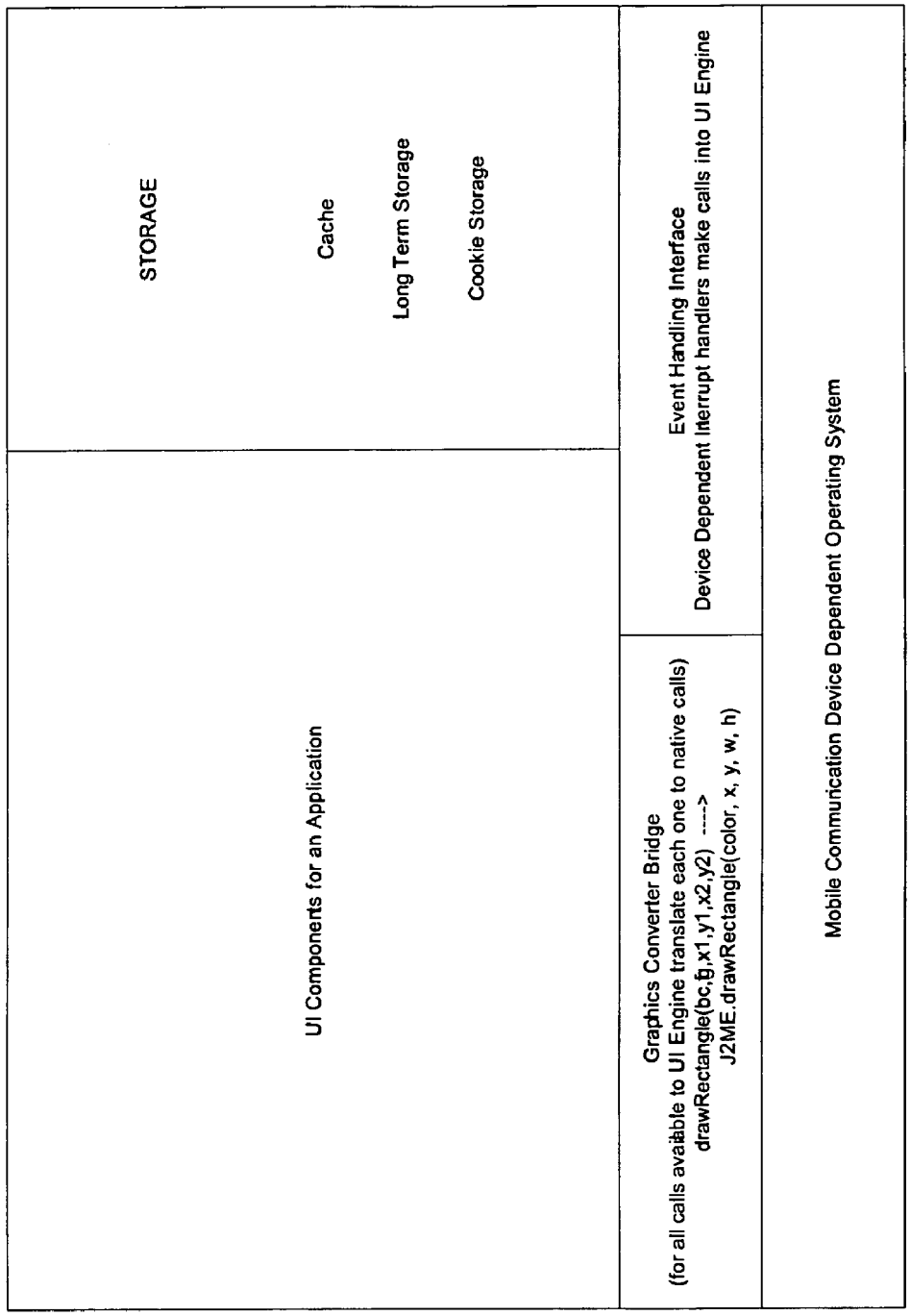
FIG. 5 shows an architectural diagram of the UI Engine.

FIG. 5 shows an architectural diagram of the UI Engine. An application comprises at least one UI component that is stored on a mobile communication device as shown in the upper left portion of the figure. Storage in temporary memory or permanent memory is shown in the upper right portion of the figure. Storage may be used to cache UI components or permanently store the UI components so that they do not have to be downloaded dynamically or per session as stored in the cache. Cookies are also stored for use by the application UI components although the UI Engine is stateful. When a UI component requests a graphical user interface element to be drawn as per a rule set, the description of the interface element is performed using the native calls of the device dependent operating system as shown in the bottom of the figure. The graphics converter bridge as shown in the middle left box in the figure is responsible for all such calls and is one of the two components that must be ported when support for a new mobile communication device is added. The event handling interface is shown in the middle right of the figure and intercepts interrupts from the native user interface portion of the device dependent operating system and interprets the interrupts as per the rule set of the current UI component being displayed. Local logic may be used to perform short circuit evaluation so that a trip to the server is not required, for example when requiring certain fields to be filled before asking the server to proceed through a work flow.

When a bug is found in an application the workflow module may be re-run in order to fix the application and re-deploy the rule set into the server system. The UI Engines have the option of dynamically asking for a UI component every time, or caching the UI component for a session or permanently storing a UI component so that the application may only ask for content to fill the needs of a UI component. Each UI component may comprise a version ID which is simply checked at any convenient time in the UI Engine and if the UI component is found to be outdated regardless of the dynamic, cached or permanent status of the UI component on the mobile communication device, then the new version of the UI component may be downloaded to correct the fixed bug. Since this download happens automatically and since the deployed rule set was changed once, the result is that a bug can be fixed once and propagated to as many types of mobile communication devices as use the application seamlessly.

The version identification of the UI Engine may be checked at any time and the UI Engine itself may be reloaded into the mobile communication device. This may occur automatically or optionally by prompting a user. Since an update to a UI Engine affects only one mobile communication device hosting a device specific operating system only those mobile communication devices hosting the specific UI Engine are affected. This is unlike the automatic update of an application across all types of mobile communication devices at once since applications are independent of the mobile communication device.

Alternatively, in order to optimize the precise application appearance, it is possible to also generate rule sets based on a resolution size for a device. This allows fine tuning of button sizes and label sizes for example in order to take full advantage of the layout of the mobile communication device specific display and may default to the standard rule set if no optimization has occurred for a range of display sizes for a given mobile communication device type.

Thus embodiments of the invention directed to a Mobile communication Device Independent Application System and Method have been exemplified to one of ordinary skill in the art. The claims, however, and the full scope of any equivalents are what define the metes and bounds of the invention.

What is claimed is:

1. A mobile communication device independent application system comprising:
   a plurality of mobile communication devices each having a device specific operating system;
   a plurality of UI Engines each configured to execute on a respective said device specific operating system;
   a server system having a rule interface component and an adapter;
   a content system having content data and configured to communicate with said server system via said adapter;
   a workflow module configured to generate a rule set independent of said device specific operating system, wherein said rule set is processed by said rule interface component;
   wherein a UI Engine selected from said plurality of UI Engines is configured to request from said rule interface component a first UI component generated from said rule set and said content data wherein said first UI component is independent of said device specific operating system; and,
   wherein said server system is configured to utilize said rule interface component to evaluate an event generated by executing said first UI component on said UI Engine and provide to said UI Engine a second UI component independent of said device specific operating system.

2. The mobile communication device independent application system of claim 1 further comprising:
   an application modification in said rule set wherein said rule set is modified once via said workflow module and uploaded to said server system and wherein each of said plurality of mobile communication devices automatically receives a modified UI component when said modified UI component is next accessed by said UI Engine regardless of said device specific operating system.

3. The mobile communication device independent application system of claim 1 wherein said rule set is in XML format and said first UI component is encoded in binary format for transmittal to a mobile communication device selected from said plurality of mobile communication devices.

4. The mobile communication device independent application system of claim 1 wherein said first UI Engine comprises a loader component for locally storing said first UI component on a mobile communication device selected from said plurality of mobile communication devices.

5. The mobile communication device independent application system of claim 4 wherein said loader component is configured to load said first UI component for each use of said first UI component.

6. The mobile communication device independent application system of claim 4 wherein said loader component is configured to cache said first UI component for a session.

7. The mobile communication device independent application system of claim 4 wherein said loader component is configured to permanently store said first UI component.

8. The mobile communication device independent application system of claim 1 further comprising:
   said first UI component dependent upon a resolution of a mobile communication device selected from said plurality of mobile communication devices.

9. A method for using a mobile communication device independent application system comprising:
   loading a plurality of mobile communication devices with respective device specific operating systems;
   downloading a plurality of UI Engines each configured to execute on a respective said device specific operating system;
   initializing a server system having a rule interface component and an adapter, coupling said server system to a content system via said adapter;
   executing a workflow module configured to generate a rule set independent of said device specific operating system wherein said rule set is processed by said rule interface component;
   requesting from said rule interface component a first UI component generated from said rule set and content data wherein said first UI component is independent of said device specific operating system;

evaluating an event in said rule interface component wherein said event is generated by executing said first UI component on said UI Engine; and, providing to said UI Engine a second UI component independent of said device specific operating system.

10. The method for using a mobile communication device independent application system of claim 9 further comprising:

modifying said rule set wherein said rule set is modified once via said workflow module;

uploading said rule set to said server system; and, receiving at each of said plurality of mobile communication devices a modified UI component when said modified UI component is next accessed by said UI Engine regardless of said device specific operating system.

11. The method for using a mobile communication device independent application system of claim 9 further comprising:

encoding said rule set in XML format; and transmitting said first UI component encoded in binary format to a mobile communication device selected from said plurality of mobile communication devices.

12. The method for using a mobile communication device independent application system of claim 9 further comprising:

loading said first UI component for each use of said first UI component.

13. The method for using a mobile communication device independent application system of claim 9 further comprising: caching said first UI component for a session.

14. The method for using a mobile communication device independent application system of claim 9 further comprising:

storing said first UI component permanently.

15. The method for using a mobile communication device independent application system of claim 9 further comprising:

downloading a resolution dependent UI component dependent upon a resolution of a mobile communication device selected from said plurality of mobile communication devices.

16. A mobile communication device independent application system comprising:

means for loading a plurality of mobile communication devices with a device specific operating system;

means for downloading a plurality of UI Engines each configured to execute on a respective said device specific operating system;

means for initializing a server system having a rule interface component and an adapter;

means for coupling said server system to a content system via an adapter;

means for executing a workflow module configured to generate a rule set independent of said device specific operating system wherein said rule set is processed by said rule interface component;

means for requesting from said rule interface component a first UI component generated from said rule set and said content data wherein said first UI component is independent of said device specific operating system;

means for evaluating an event in said rule interface component wherein said event is generated by executing said UI component on said UI Engine; and, means for providing to said UI Engine a second UI component independent of said device specific operating system.

17. The mobile communication device independent application system of claim 16 further comprising:

means for fixing a bug in modifying said rule set wherein said rule set is modified once via said workflow module;

means for uploading said rule set to said server system; and, means for receiving at each of said plurality of mobile communication devices a modified UI component when said modified UI component is next accessed by said UI Engine regardless of said device specific operating system.

18. The mobile communication device independent application system of claim 16 further comprising:

means for encoding said rule set in XML format; and means for transmitting said first UI component encoded in binary format to a mobile communication device selected from said plurality of mobile communication devices.

19. The mobile communication device independent application system of claim 16 further comprising:

means for loading said first UI component for each use of said first UI component.

20. The mobile communication device independent application system of claim 16 further comprising:

means for caching said first UI component for a session.

21. The mobile communication device independent application system of claim 16 further comprising:

means for said first UI component permanently.

22. The mobile communication device independent application system of claim 16 further comprising:

means for downloading a resolution dependent UI component dependent upon a resolution of a mobile communication device selected from said plurality of mobile communication devices.

* * * * *